United States Patent [19]
Ciesko et al.

[11] Patent Number: 5,949,027
[45] Date of Patent: Sep. 7, 1999

[54] CABLE MANAGEMENT RING

[75] Inventors: Mark J. Ciesko; William P. Wear; Thomas J. Misage; Jeremy H. Galten; Jonathan Guerra, all of San Francisco, Calif.; William Kilmer, West Jordan, Utah; Brad Romney; Sean Varely, both of Salt Lake City, Utah

[73] Assignee: Dayna Communications, Salt Lake City, Utah

[21] Appl. No.: 08/876,411

[22] Filed: Jun. 16, 1997

[51] Int. Cl.$^6$ ...................................................... H01B 7/00
[52] U.S. Cl. ............................................................ 174/135
[58] Field of Search ............................... 174/135, 48, 50; 24/16 R; 248/74.2; 439/471

[56] References Cited

U.S. PATENT DOCUMENTS

| | | | |
|---|---|---|---|
| 2,292,140 | 8/1942 | Lofgren | 192/78 |
| 3,297,815 | 1/1967 | Drettmann | 174/48 |
| 3,593,383 | 7/1971 | Ellis | 24/46 |
| 3,620,896 | 11/1971 | Glasgow | 428/167 |
| 3,651,544 | 3/1972 | Soma | 24/16 R |
| 3,721,750 | 3/1973 | Countryman | 174/135 |
| 3,792,417 | 2/1974 | Punako | 439/471 |
| 3,819,139 | 6/1974 | Jemison | 242/340 |
| 3,889,909 | 6/1975 | Koscik | 248/56 |
| 3,905,570 | 9/1975 | Nieuwveld | 248/71 |
| 3,992,566 | 11/1976 | Kerrimov et al. | 174/42 |
| 4,021,888 | 5/1977 | Aimar | 24/16 PB |
| 4,131,258 | 12/1978 | Okuda et al. | 248/73 |
| 4,158,250 | 6/1979 | Ringwald | 24/16 R |
| 4,188,004 | 2/1980 | Fulton et al. | 248/74.3 |
| 4,274,612 | 6/1981 | Massey | 248/74.3 |
| 4,455,720 | 6/1984 | Sutton | 24/20 S |
| 4,870,722 | 10/1989 | Shell, Jr. | 24/16 R |
| 4,941,932 | 7/1990 | John | 156/48 |
| 5,088,191 | 2/1992 | Lazaro, Jr. et al. | 29/867 |
| 5,319,837 | 6/1994 | Kujawski | 24/16 R |
| 5,390,883 | 2/1995 | Songhurst | 248/74.3 |
| 5,639,049 | 6/1997 | Jennings et al. | 248/74.2 |

*Primary Examiner*—Thomas M. Dougherty
*Assistant Examiner*—Joseph Waks
*Attorney, Agent, or Firm*—Lloyd W. Sadler

[57] ABSTRACT

A one-piece cable management ring is described that includes a snap attachment device for attaching and locking it to an electronic component enclosure. The ring is composed of a somewhat flexible material permitting it to function as cable strain relief. It has an opening in one side to permit easy access to the interior of the ring and also easy non-destructive removal from the ring.

1 Claim, 2 Drawing Sheets

CABLE MANAGEMENT RING

BACKGROUND OF THE INVENTION

Field of the Invention

This invention relates to a cable or wire support and strain relief. More particularly, this invention to a one piece cable bundle and management ring designed to attachable, with no tools needed, to an electronic component housing.

2. Description of Related Art

Various approaches are widely used to manage, route and provide strain relief to wire and/or cables especially as related to electronics devices. However, in most cases the device can only be used once, requires special tools to install the cables, and/or does not easily connect to the electronics component housing.

For general background material, the reader is directed to U.S. Pat. Nos. 3,593,383, 3,620,896, 3,721,750, 3,792,417, 3,819,139, 3,889,909, 4,021,888, 4,158,250, 4,188,004, 4,274,612, 4,455,720, 4,941,932, 5,088,191, 5,319,837, and 5,390,883 each of which is hereby incorporated by reference in its entirety for the material disclosed therein.

SUMMARY OF THE INVENTION

It is desirable to provide a one-piece cable management ring for securing and providing strain relief for cables, whereby the cable management ring is easily attachable and detachable to an electronic component enclosure.

Accordingly, it is a general objective of this invention to provide a one-piece cable management ring that attaches to an electronic component enclosure.

Another objective of this invention is to provide a one-piece cable management ring that provides cable strain relief.

A further objective of this invention is to provide a cable management ring that when properly used keeps cables from getting tangled and mis-routed.

Additional objects, advantages and novel features of the invention will be set forth in part in the description which follows, and in part will become apparent to those skilled in the art upon examination of the following or may be learned by the practice of the invention. The objects and advantages of this invention may be realized and attained by means of the instruments and combinations particularly pointed out in the appended claims.

These and other objectives of this invention are achieved by a ring device, composed of ABS, Noryl, HIPS plastic, rubber of the equivalent, and having an opening on one side and having a snap attachment point for connecting to the electronic component enclosure.

DETAILED DESCRIPTION OF THE INVENTION

Figure 1:
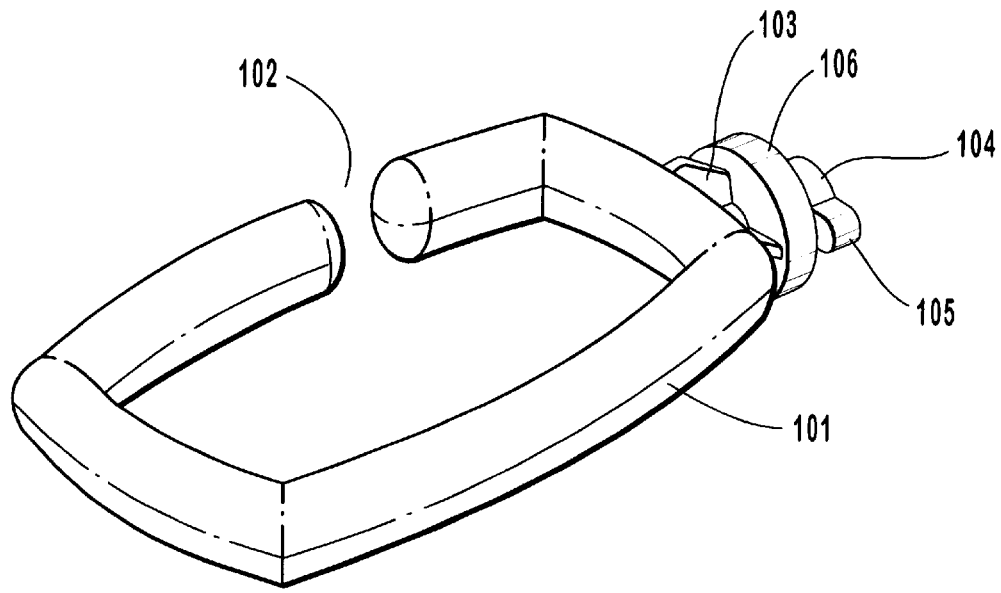
FIG. 1 is a perspective view of the cable management ring invention.

FIG. 1 depicts the preferred embodiment of the invention. Cable management is provided by the "C" shaped ring 101, having a gap, or cable insertion port, 102 for introducing the cables to the interior of the ring 101. An attachment device 104 is provided to connect the invention to an electronics enclosure or other device to which it is desired to restrain the cables. A mount 103 is provided to connect the attachment device 104 to the ring 101.

In the preferred embodiment of the invention, the invention is composed of ABS or Noryl plastic. Alternative materials include: HIPS plastic, rubber, metal, coated metal and the equivalent. Typically, the ring portion of the invention is approximately one inch across, 2.2 inches in height and 0.25 inches in width. Also, typically the mount 103 is angled away from the ring 101 at approximately 45 degrees. In its best mode, the attachment device 104 is adapted to be a slot and slide attachment wherein the mount 103 fits snugly into a slot opening in an electronic component enclosure or other housing. Once inserted, the mount 103 can easily be turned to secure the invention to the enclosure.

The design of the invention makes inserting a cable an easy process of slipping the cable through the opening 102. This design permits cables to be held and released without requiring that the ring be destroyed or damaged. Moreover, the selection and use of the material used in forming the device provides some flexibility, which thereby provides cable strain relief.

Figure 2:
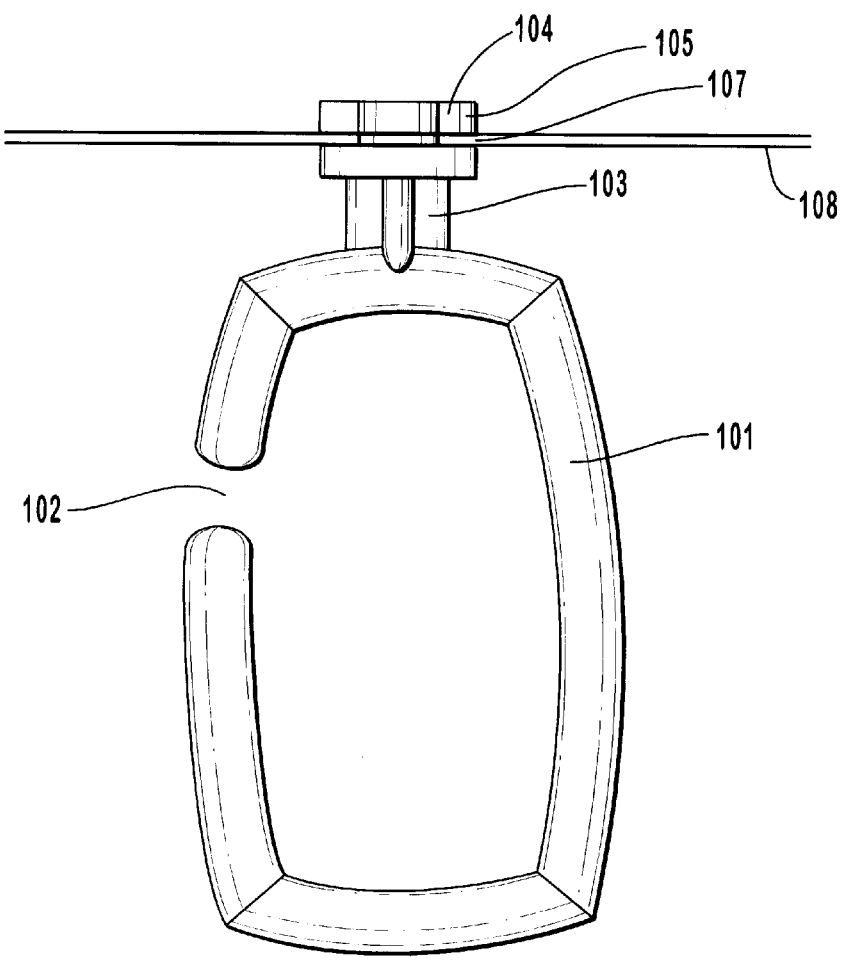
FIG. 2 is a side view of the cable management ring invention in its preferred embodiment.

FIG. 2 is a side view of the invention providing an additional perspective of the best mode of the invention.

Figure 3:
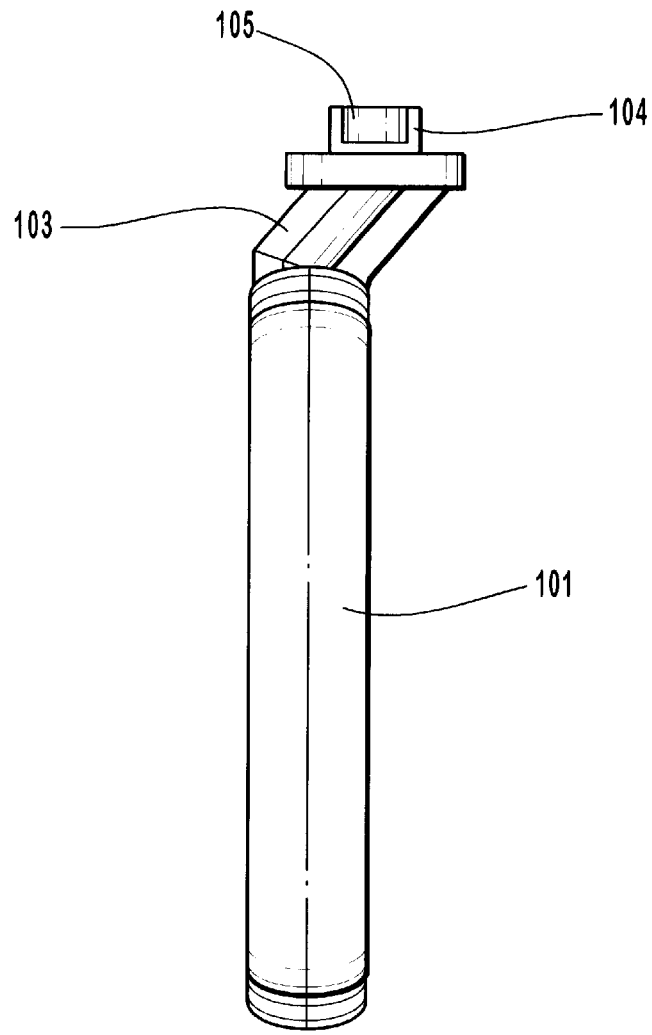
FIG. 3 is an edge on view of the cable management ring invention.

FIG. 3 is an edge view of the invention providing still another perspective of the best mode of the invention.

Figure 4:
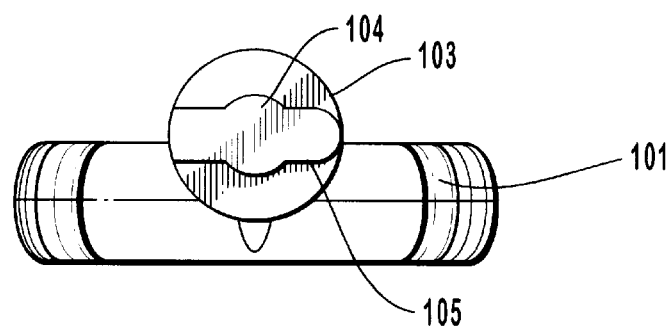
FIG. 4 is a top view of the cable management ring invention.

FIG. 4 is a top view of the invention providing another perspective of the best mode of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled, including the range of equivalents to the appended claims.

We claim:

1. A cable management ring, for holding cables, and keeping said cables from getting tangled or misrouted, comprising:

(A) a ring portion for holding cable;

(B) an attachment device for connecting the ring to an enclosure; and (C) a mount connecting said ring portion to said attachment device wherein said mount is angled to offset said ring from said attachment device.

* * * * *